United States Patent
Tsuie et al.

(10) Patent No.: US 8,116,364 B2
(45) Date of Patent: Feb. 14, 2012

(54) SELECTIVE SLICING EQUALIZER

(75) Inventors: Yih-Ming Tsuie, Hsinchu (TW);
Wei-Ting Wang, Yilan County (TW)

(73) Assignee: Mediatek Inc., Hsin-Chu (TW)

( * ) Notice: Subject to any disclaimer, the term of this patent is extended or adjusted under 35 U.S.C. 154(b) by 1275 days.

(21) Appl. No.: 11/736,699

(22) Filed: Apr. 18, 2007

(65) Prior Publication Data
US 2008/0260017 A1   Oct. 23, 2008

(51) Int. Cl.
*H03H 7/30*   (2006.01)
(52) U.S. Cl. ........................................ 375/229
(58) Field of Classification Search .................. 375/229, 375/230, 232, 233, 234, 235; 333/17.1, 18, 333/28 R; 708/100, 200, 300, 322, 323
See application file for complete search history.

(56) References Cited

U.S. PATENT DOCUMENTS

| | | | |
|---|---|---|---|
| 5,712,873 A * | 1/1998 | Shiue et al. | 375/233 |
| 5,748,674 A | 5/1998 | Lim | |
| 7,463,679 B2 * | 12/2008 | Nemer | 375/232 |
| 2002/0126222 A1* | 9/2002 | Choi et al. | 348/614 |
| 2005/0154967 A1* | 7/2005 | Heo et al. | 714/792 |
| 2005/0190832 A1 | 9/2005 | Ibragimov et al. | |
| 2005/0207485 A1 | 9/2005 | Lai | |

* cited by examiner

*Primary Examiner* — David C. Payne
*Assistant Examiner* — Vineeta Panwalkar
(74) *Attorney, Agent, or Firm* — Thomas|Kayden

(57) ABSTRACT

An equalizer. The equalizer, either operated in a blind mode or a decision directed mode, comprises a feed-forward filter, a feedback filter, a decision device, a control circuit, and a multiplexer. The feed-forward filter receives an input signal. The feedback filter filters an equalized signal. The combiner combines the feed-forward filtered signal and the feedback filtered signal. The decision device maps the combined signal to one symbol of a symbol set. The control circuit receives the combined output and generates a slice control signal. The multiplexer selects the combined signal or the mapped signal as the equalized according to the slice control signal when operated in the blind mode.

17 Claims, 10 Drawing Sheets

SELECTIVE SLICING EQUALIZER

BACKGROUND OF THE INVENTION

Field of the Invention

The present invention relates to a communication device, and, more particularly, to channel equalizers of a communication device.

To compensate the effects of a band-limited transmission channel, many digital data communication systems employ an equalizer to remove intersymbol interference (ISI) in the received signal. ISI causes the value of a given symbol to be distorted by the values of preceding and following symbols, and essentially represents symbol "ghosts" since ISI includes advanced and delayed symbols with respect to a reference symbol location in a given decision region. FIG. 1 shows an equivalent discrete-time model of channel with intersymbol interference. Sequence $\{I_n\}$ represents the symbols sent to a band-limited channel, and sequence $\{y_n\}$ is the received signal at output of the band-limited channel. An equalization process estimates the transfer function of the transmission channel and applies the inverse of the transfer function to the received signal so as to reduce or eliminate the distortion effects. One approach to compensate for the ISI is a linear filter. The equalized output $\hat{I}_k$ may be expressed as $$\hat{I}_k = \sum_{j=-K}^{K} c_j v_{k-j} \quad (1)$$

where $\{c_j\}$ are the tap weight coefficients of the linear filter. Another approach to compensate for the ISI is a decision-feedback equalizer (DFE). A DFE consists of two filters, a feed-forward filter (FFF) and a feedback filter. FIG. 2 shows a structure of decision-feedback equalizer. The input to the feed-forward section is the received signal sequence $\{v_n\}$. The input of the feedback filter is the sequence of decisions on previously detected symbols. The filtered output $\hat{I}_k$ can be expressed as $$\hat{I}_k = \sum_{j=-K_1}^{0} c_j v_{k-j} + \sum_{j=1}^{K_2} c_j \tilde{I}_{k-j}, \quad (2)$$

and the equalized output $\tilde{I}_k$ is quantized to the nearest (in symbol space) information symbol to form the decision $\hat{I}_k$.

In most communication systems that employ equalizers, the channel characteristics are unknown a priori, and, in many cases, the channel characteristics are time-variant. In other words, the coefficients $\{c_j\}$ are unknown and time-variant. In such a case, the equalizers are designed to be adjustable to the channel response and, for time-variant channels, to be adaptive to the time variations in the channel response.

FIG. 3a shows an example of an adaptive linear equalizer, and FIG. 3B show an adaptive decision feedback equalizer. In systems using an adaptive equalizer, it is necessary to provide a method of adapting the filter response so as to adequately compensate for channel distortions. Various algorithms could be used to adjust the tap coefficients of the equalizer with different error generating rules.

When the equalizer is initiated, the coefficient values (filter tap weights) are usually not set at values which produce adequate compensation of channel distortions. In order to force initial convergence of the equalizer coefficients, a known "training" sequence may be used as reference signals. These signals are known at both the transmitter and receiver. An equalization error signal is formed at the receiver by subtracting the equalized symbol from the known symbol according to the training sequence. After adapting with the training sequences, the equalization error may gradually reduce, and the equalizer is switched to a decision-directed (DD) operating mode. In decision-directed mode, final convergence of the filter tap weights is achieved by using the decision of symbols from the output of the equalizer instead of using the training sequence.

In some systems, however, a training sequence is not available, or is too short to train coefficients of linear filters. An equalizer based on initial adjustment of the coefficients without the benefit of a training sequence are said to be "blind". A DFE equalizer performs blind equalization initially, and then switches to decision-directed equalization. When operated in blind mode, equalizer coefficient values are coarsely adjusted in response to an error signal which is calculated by a blind equalization algorithm, while in the decision-directed mode, filter coefficients are updated to finer values.

In blind mode, the coefficient values are not yet converged, thus the equalized output $\tilde{I}_k$ in blind mode may not identical to the transmitted information symbol $I_k$. If the equalization error $\tilde{I}_k$-$I_k$ is large enough to let the symbol decision device mis-decides filtered output $\hat{I}_k$, the equalization error may prorogate in the DFE equalizer and leads the coefficients value to diverge.

BRIEF SUMMARY OF THE INVENTION

Accordingly an equalizer to reduce error propagation while prevent noise enhancement. The equalizer comprises a feed-forward filter, a feedback filter, a combiner, a decision device, and a control circuit. The feed-forward filter receives an un-equalized input signal. The feedback filter filters an equalized signal. The combiner combines the feed-forward filtered signal and the feedback filtered signal. The decision device maps the combined signal to one symbol of a symbol set. The control circuit receives the combined output and generates a slice control signal. When the equalizer is operated in blind mode, the multiplexer selects the combined signal or the mapped signal as the equalized signal according to the slice control signal.

To generate the slice control signal, several equalization algorithms are employed. In one embodiment of the invention, when results of the equalization algorithms have the same direction about adjusting the coefficients of the feed-forward and feedback filters, the multiplexer selects the mapped signal as the equalized signal, otherwise, the multiplexer selects the combined signal as equalized signal.

In another aspect of the invention, the slice control signal can be generated according to another method. The method is to map a range of values into several regions. The method comprises providing a first mapping function. The first mapping function maps a range of combined result to a first result, and the first result is either positive or negative. A second mapping function is provided. The second mapping function maps the range of combined result to a second result. The second result is either positive or negative, and the first and second mapping functions are different. The first and second results are compared to obtain the slice control signal. When the first and second results are in the same sign, the slice control signal is activated, which means the multiplexer selects the mapped result as the input of the feedback filter. When the first and second results are in different signs, the slice control signal is not activated, which means the multiplexer selects the combined result as the input of the feedback filter. A table is built to store the relationship of the ranges and the slice control signal.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the present invention.

DETAILED DESCRIPTION OF THE INVENTION

Figure 1:
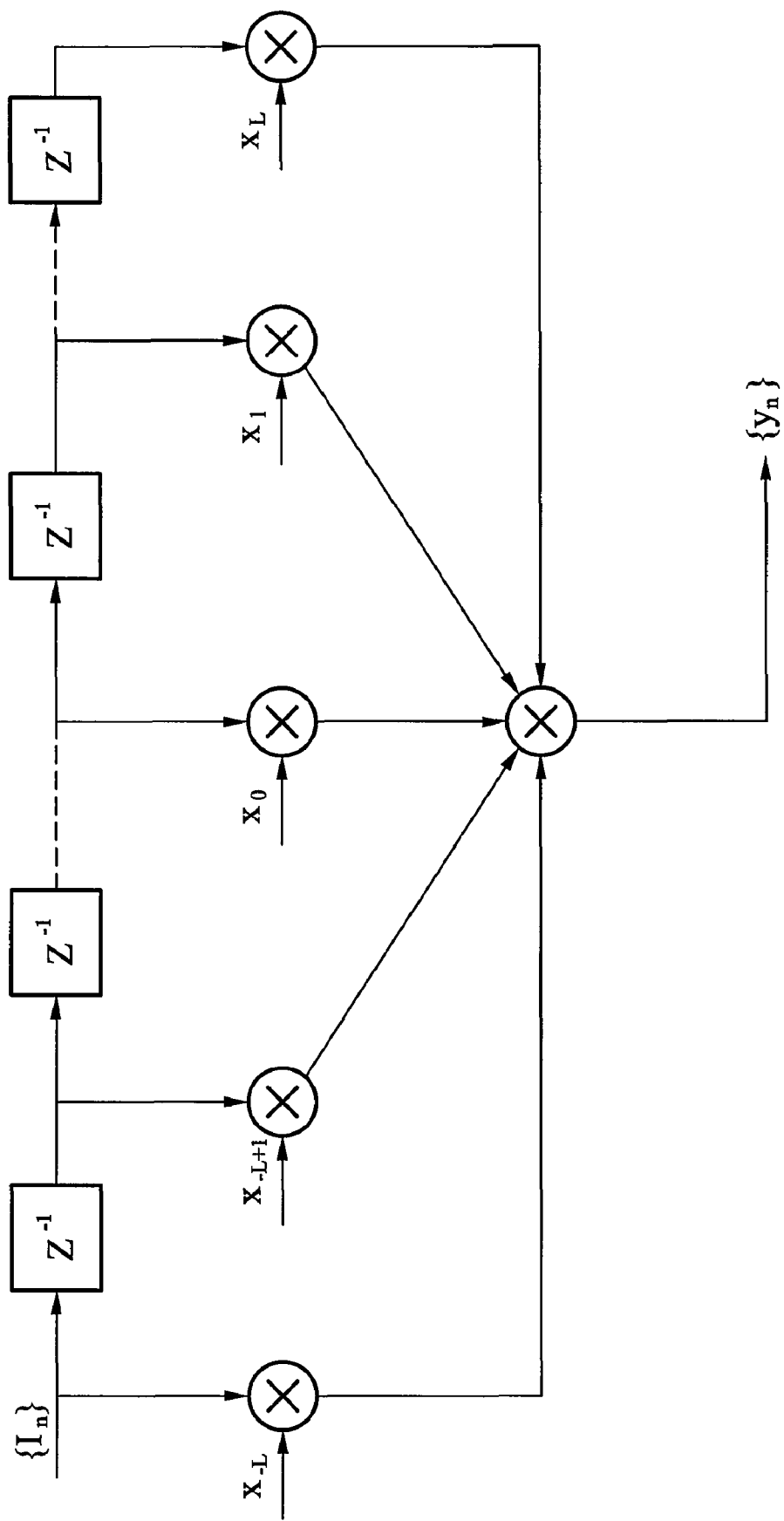
FIG. 1 shows an equivalent discrete-time model of channel with intersymbol interference.
Figure 2:
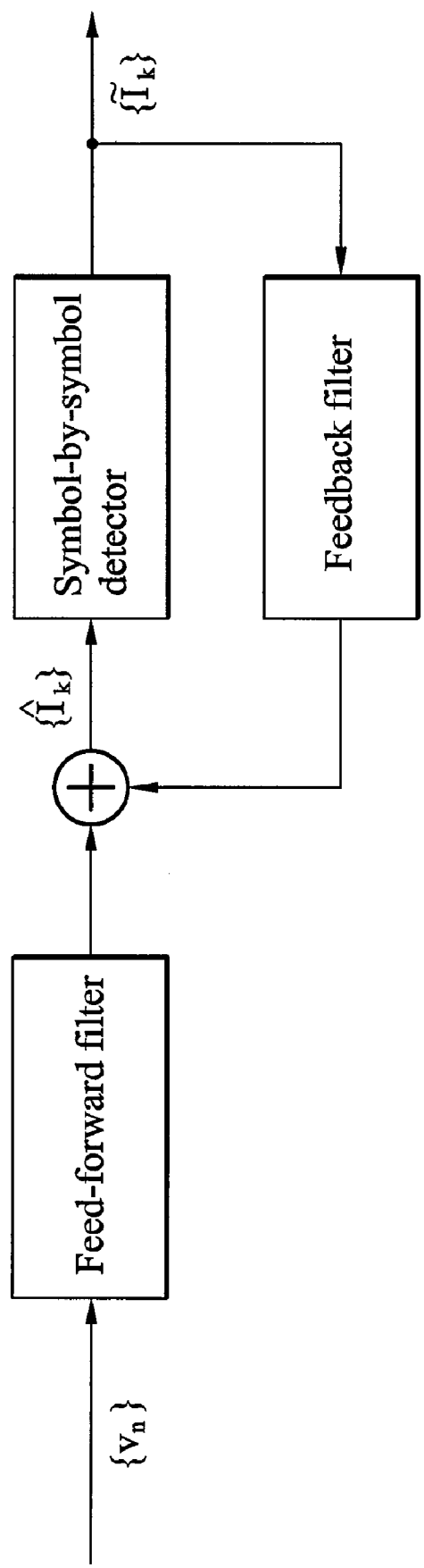
FIG. 2 shows a structure of a decision-feedback equalizer.
Figure 3A:
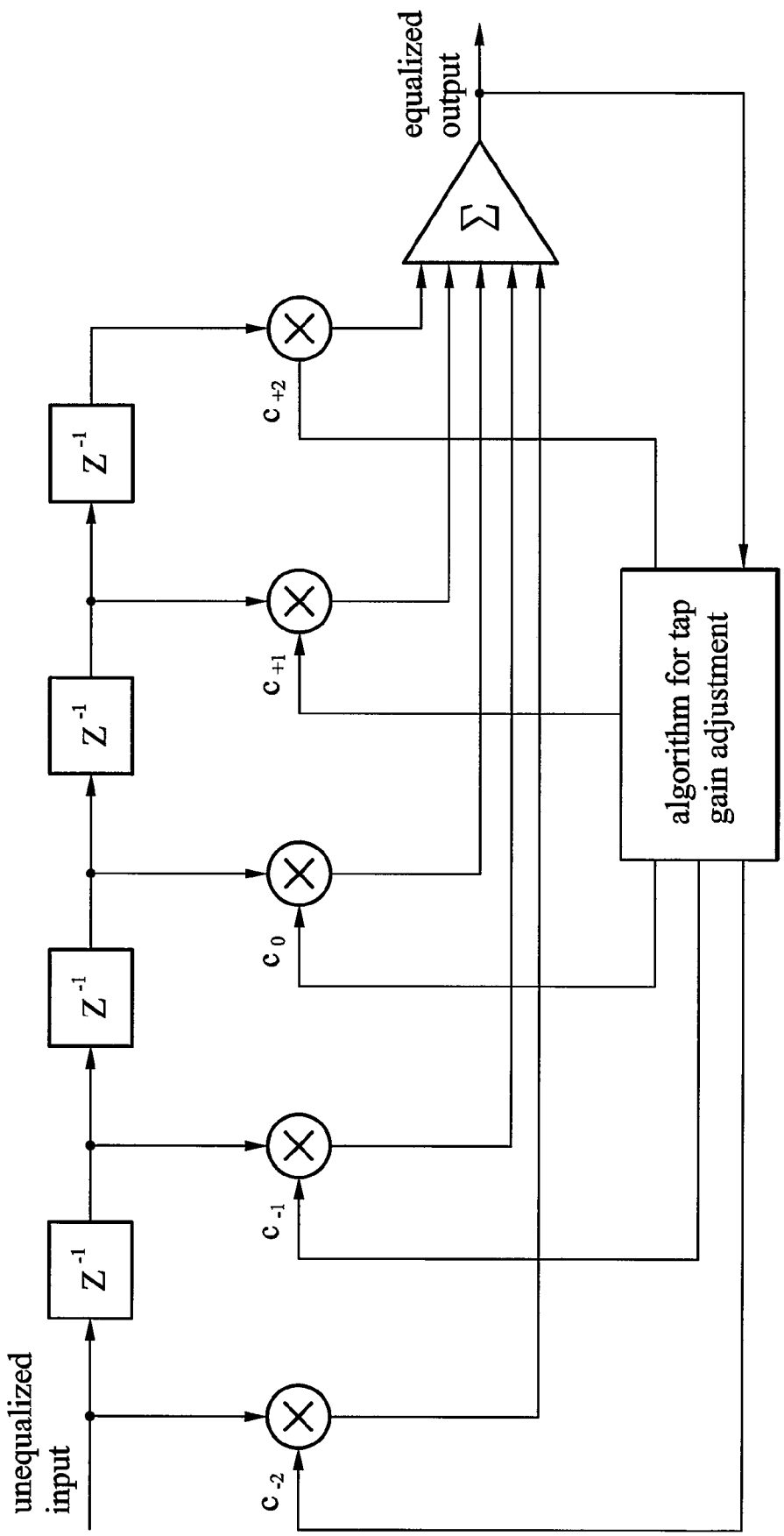
FIG. 3A shows an example of an adaptive linear equalizer.
Figure 3B:
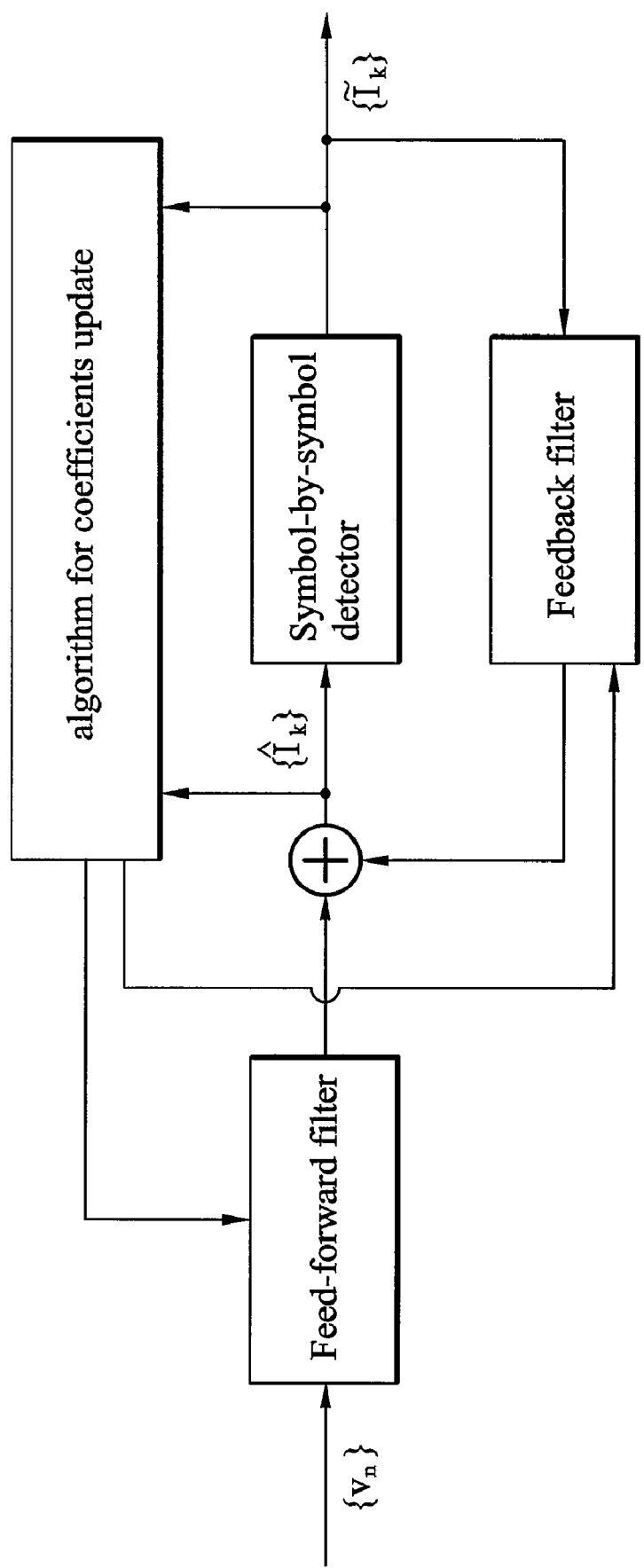
FIG. 3B shows an adaptive decision feedback equalizer.
Figure 4:
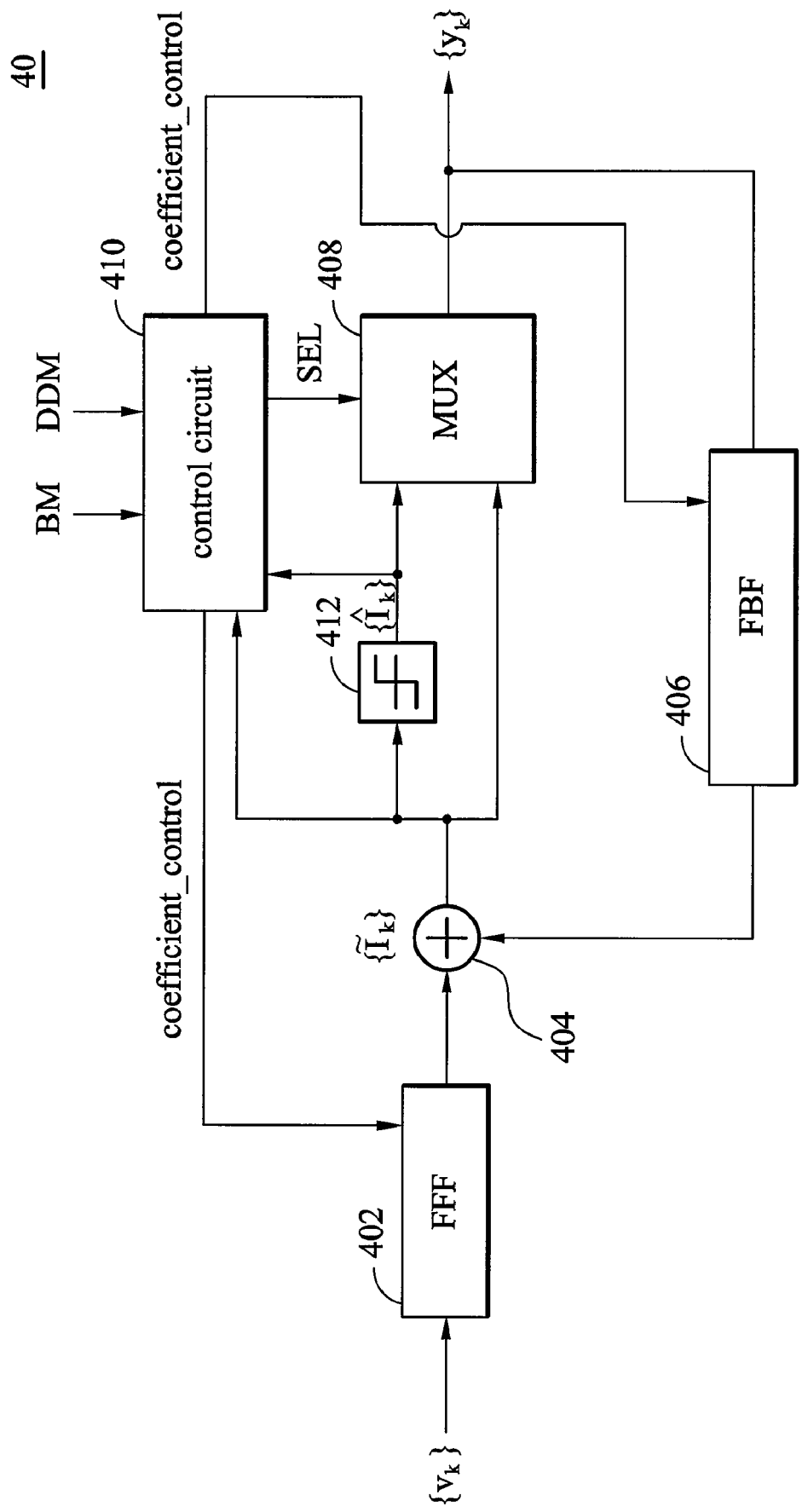
FIG. 4 shows a block diagram of a decision feedback equalizer 40 according to an embodiment of the invention.
Figure 5A:
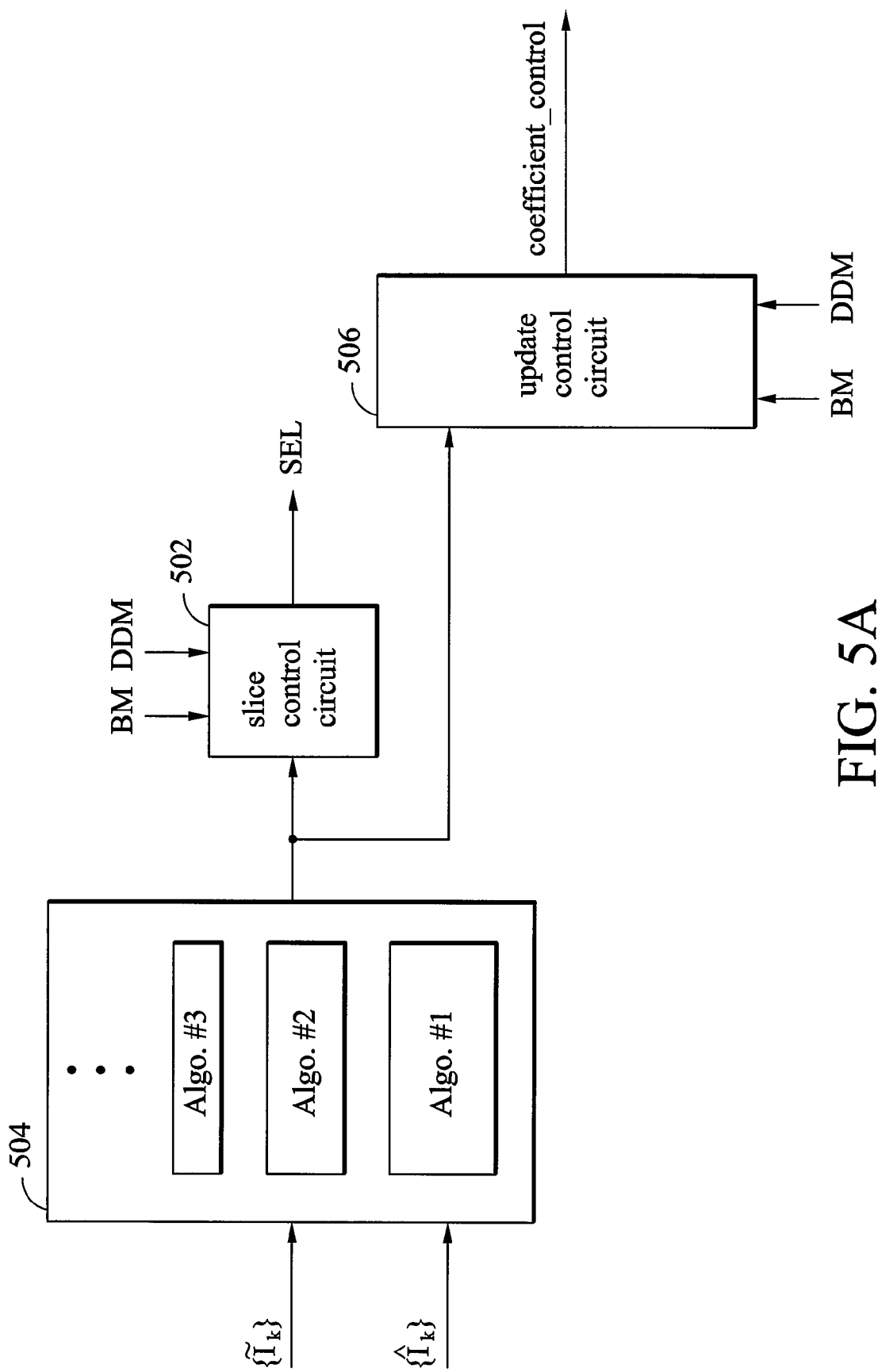
FIG. 5A shows a block diagram of a control circuit 410.

FIG. 4 shows a block diagram of a decision feedback equalizer 40 according to an embodiment of the invention. Feed-forward filter (FFF) 402 receives an input $\{v_k\}$ containing intersymbol interference (ISI) caused by a transmission channel. The feed-forward filtered signal is combined by a combiner 404 with a feedback filtered signal from a feedback filter (FBF) 406. The input signals of feedback filter 406 are equalized and sliced output $\{y_k\}$, thus, feedback filter 406 is also known as decision feedback filter. Both feed-forward filter 402 and feedback filter 406 can be linear equalizers. The equalizer 40 can be operated in two-modes, blind mode and decision directed (DD) mode. The symbol decision circuit 412 slices $\{\tilde{I}_k\}$ to the nearest (in symbol space) information symbol $\{\hat{I}_k\}$. When operated in decision directed mode, a multiplexer (MUX) 408 selects the sliced $\{\hat{I}_k\}$ as input of the feedback filter 406. When operated in blind mode, the multiplexer 408 selects one of its inputs according to a slice control signal (SEL). The slice control signal is generated by a control circuit 410. FIG. 5A shows a block diagram of a control circuit 410. The slice control signal is generated according to a slice control circuit 502 integrating the results of several equalization algorithms. In this embodiment of the invention, the equalization algorithms are coefficient updating algorithms. The combined results $\{\tilde{I}_k\}$ are sent to error signal generating module 504. The error signal generating module 504 employs several equalization algorithms to obtain different error signals, thus, the error signal generating module 504 can be implemented in hardware, or by processing certain software with equivalent functions. The error signal outputs of the error signal generating module 504 indicates the error between equalized symbol $\{y_k\}$ and the corresponding transmitted symbol $\{I_k\}$. One of the error signals is applied to adaptively adjust the coefficients of linear filters 402 and 406. The slice control circuit 502 collects the error signals of different algorithms from error signal generating module 504 and counts the number of positive errors and negative errors.

The slice control circuit 502 then outputs the slice control signal according to the number of positive errors and negative errors. For example, if there are 3 equalization algorithms #1, #2, and #3 are applied to the error signal generating module and all results of the error signal generating module have the same sign, for instance, positive, the slice control circuit 502 activates the slice control signal. When receiving the activated slice control signal, the multiplexer 408 selects the sliced output as the input of the feedback filter 406. To update the coefficients of linear filters 402 and 406, the results of the error signal generating module 504 is sent to an update control circuit 506. When the equalizer 40 is operated in blind mode, a blind error calculated by the error signal generating module 504 is applied. When the equalizer is operated in decision directed mode, a decision directed error calculated by the error signal generating circuit 504 is applied.

In one embodiment of the invention, the slice control circuit 502 activates the slice control signal by the majority results of the algorithms. The equalization algorithm can be constant-modulus algorithm (CMA), Sato, least-mean-square (LMS), etc. In another embodiment of the invention, the slice control circuit 502 activates the slice control signal when all the errors calculated by the equalization algorithms have the same sign. In yet another embodiment of the invention, the slice control circuit 502 activates the slice control signal according to certain equalization algorithms, such as CMA or Sato, where these algorithms are most widely used algorithms in practice.

The slice control circuit 502 receives the errors of different algorithms as well as the blind mode signal and the decision-directed mode signal. When the decision-directed mode signal is activated, the multiplexer 408 selects $\{\hat{I}_k\}$ as the input of the feedback filter 406. When the blind mode signal is activated, the multiplexer 408 selects the sliced results $\{\hat{I}_k\}$ or unsliced results $\{\tilde{I}_k\}$ according to the slice control signal. Table 1 shows a summary of the slice control signal in each operation mode and corresponding multiplexer output.

TABLE 1

| Slice control signal and operated mode | | |
|---|---|---|
| Operating Mode | slice control signal = 0 | slice control signal = 1 |
| blind mode | $\{\tilde{I}_k\}$ | $\{\hat{I}_k\}$ |
| decision-directed mode | $\{\hat{I}_k\}$ | $\{\hat{I}_k\}$ |

When operated in decision directed mode, both the coefficients of the linear filters 402 and 406 are updated by the error information generated by the updating control circuit 506. The updating control circuit 506 selects a decision-directed error as its output when operated in decision directed, and selects one blind algorithm result (e.g. Sato error or Godard error) as its output when operated in blind mode. The coefficients can be updated according to the formula:

$$Cff(n+1) = Cff(n) + \mu Sff e^*(n) \quad (3)$$

$$Cfb(n+1) = Cfb(n) + \mu Sfb e^*(n)$$

wherein Cff(n) and Cfb(n) are respectively the coefficient vector of the feedforward filter and the feedback filter of present time, Sff is the symbols in the tap delay line of the feedforward filter, Sfb is the symbols in the tap delay line of the feedback filter, e*(n) is the error information from coefficient update circuit 506 or coefficient updating module 504, and μ is the step size.

In another embodiment of the invention, the slice control circuit 502 generates the slice control signal according other criteria. The combined result $\{\tilde{I}_k\}$ is divided into several regions. Each region is marked as either a slicing region or an un-slicing region. When the equalizer operated in blind mode and a $\{\tilde{I}_k\}$ falls into a slicing region, the slice control circuit 502 activates the slice control signal. If operated in blind mode and $\{\tilde{I}_k\}$ falls into an un-slicing region, the slice control circuit 502 does not activate the slice control signal. When operated in decision directed mode, the slice control circuit does not activate the slice control signal. The relationship of combined result $\{\tilde{I}_k\}$, slice region and un-slice region can be organized into a table. For instance, Table 2 shows an example of $\{\tilde{I}_k\}$, a slice region and an un-slice region. The values shown in Table 2, however, are examples of this embodiment only, hence they do not limit the invention thereto.

TABLE 2

An example of $\{\tilde{I}_k\}$, a slice region and an un-slice region

| Values of $\{\tilde{I}_k\}$ | Regions |
|---|---|
| $2.1 \leq \{\tilde{I}_k\}$ | slice region |
| $1.9 \leq \{\tilde{I}_k\} < 2.1$ | un-slice region |
| $1.1 \leq \{\tilde{I}_k\} < 1.9$ | slice region |
| $0.9 \leq \{\tilde{I}_k\} < 1.1$ | un-slice region |
| $-1.1 \leq \{\tilde{I}_k\} < 0.9$ | slice region |
| $-1.9 \leq \{\tilde{I}_k\} < -1.1$ | un-slice region |
| $\{\tilde{I}_k\} < -1.9$ | slice region |

Figure 5B:
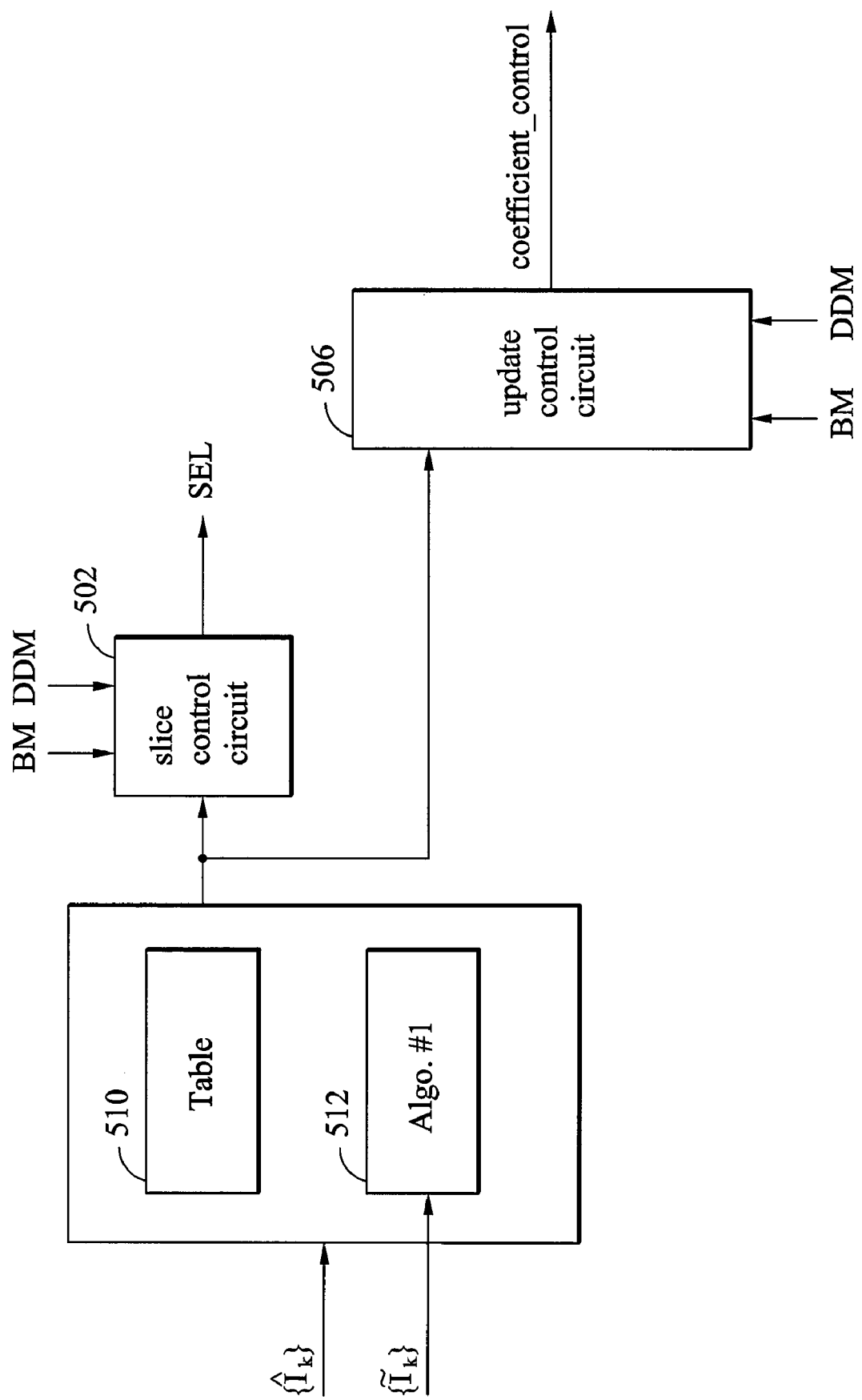
FIG. 5B shows a block diagram of the selective slice equalizer according to an embodiment of the invention.
Figure 6:
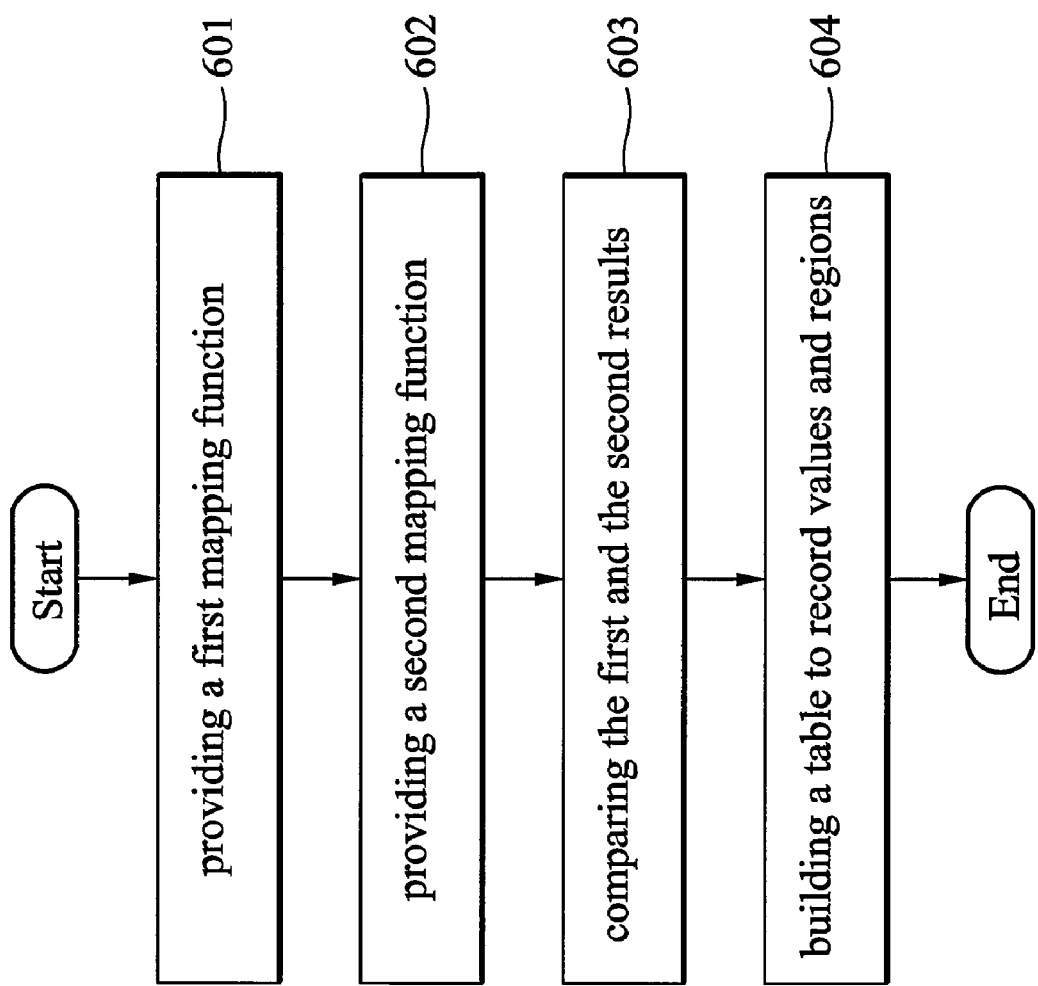
FIG. 6 shows the method to part the range of $\{\tilde{I}_k\}$ into several regions.

FIG. 6 shows the method to part the range of $\{\tilde{I}_k\}$ into several regions. The method begins with providing a first mapping function in step 601. The first mapping function maps values of $\{\tilde{I}_k\}$ to a first result, and the first result is either positive or negative. A second mapping function is providing in step 602, wherein the second mapping function maps the range of values to a second result, which is either positive or negative. The first and second mapping functions are different. The first and second results are compared to obtain a decision result in step 603, when the first and second results are in the same sign, the decision result is to slice. When the first and second results are in different signs, the decision result is not to slice. A table is built to record the relationship of different values of $\{\tilde{I}_k\}$ and the decision results. In some embodiments of the invention, the number of mapping functions can be extended to N. When applied N mapping functions, the first result to $n^{th}$ result are compared to obtain a decision result in the step 603. When most of the signs are in the same range, the range of $\{\tilde{I}_k\}$ is marked as a slice region. FIG. 5B shows a block diagram of the selective slice equalizer according to an embodiment of the invention.

The following example illustrates how to part the values of $\{\tilde{I}_k\}$ into these regions. Suppose there are 3 equalization algorithms applied. First, record the range of $\{\tilde{I}_k\}$ which the equalization algorithm # 1 would recognize as positive or negative error, as shown in Table 3. Next, record the values of $\{\tilde{I}_k\}$ which the equalization algorithm #2 and #3 would recognize as positive or negative error. Table 4 and 5 show the relationship of values of $\{\tilde{I}_k\}$ equalization algorithm #2 and #3, respectively. Consider the regions where all three algorithms recognize as positive or negative error, and mark these regions as slice region. Others regions are un-slicing regions. For example, when $\{\tilde{I}_k\}$ exceeds 2.1, the signs of all the algorithms are negative. A range from 2.1 to infinity is marked as a slice region. When $\{\tilde{I}_k\}$ is less than 2.1 but excess than 1.9, the signs of algorithms are not the same. Thus, the range from 1.9 to 2.1 is marked as un-slice region.

TABLE 3

An example of positive region and negative regions according to equalization algorithm # 1

| Values of $\{\tilde{I}_k\}$ | Signs of algorithm # 1 |
|---|---|
| $2.0 \leq \{\tilde{I}_k\}$ | negative |
| $1.0 \leq \{\tilde{I}_k\} < 2.0$ | positive |
| $0 \leq \{\tilde{I}_k\} < 1.0$ | negative |
| $-1.0 \leq \{\tilde{I}_k\} < 0$ | positive |
| $-2.0 \leq \{\tilde{I}_k\} < -1.0$ | negative |
| $\{\tilde{I}_k\} < -2.0$ | positive |

TABLE 4

An example of positive region and negative regions according to equalization algorithm # 2

| Values of $\{\tilde{I}_k\}$ | Signs of algorithm # 2 |
|---|---|
| $2.1 \leq \{\tilde{I}_k\}$ | negative |
| $1.1 \leq \{\tilde{I}_k\} < 2.1$ | positive |
| $0.1 \leq \{\tilde{I}_k\} < 1.1$ | negative |
| $-0.9 \leq \{\tilde{I}_k\} < 0.1$ | positive |
| $-1.9 \leq \{\tilde{I}_k\} < -0.9$ | negative |
| $\{\tilde{I}_k\} < -1.9$ | positive |

TABLE 5

An example of positive region and negative regions according to equalization algorithm # 3

| Values of $\{\tilde{I}_k\}$ | Signs of algorithm # 3 |
|---|---|
| $1.9 \leq \{\tilde{I}_k\}$ | negative |
| $0.9 \leq \{\tilde{I}_k\} < 1.9$ | positive |
| $-0.1 \leq \{\tilde{I}_k\} < 0.9$ | negative |
| $-1.1 \leq \{\tilde{I}_k\} < -0.1$ | positive |
| $-2.1 \leq \{\tilde{I}_k\} < -1.1$ | negative |
| $\{\tilde{I}_k\} < -2.1$ | positive |

In another embodiment of the invention, slice regions can be marked in response to 2 or more algorithms with the same sign. In yet another embodiment of the invention, the marked region can be results of a certain algorithm, such as the widely used CMA algorithm.

Figure 7:
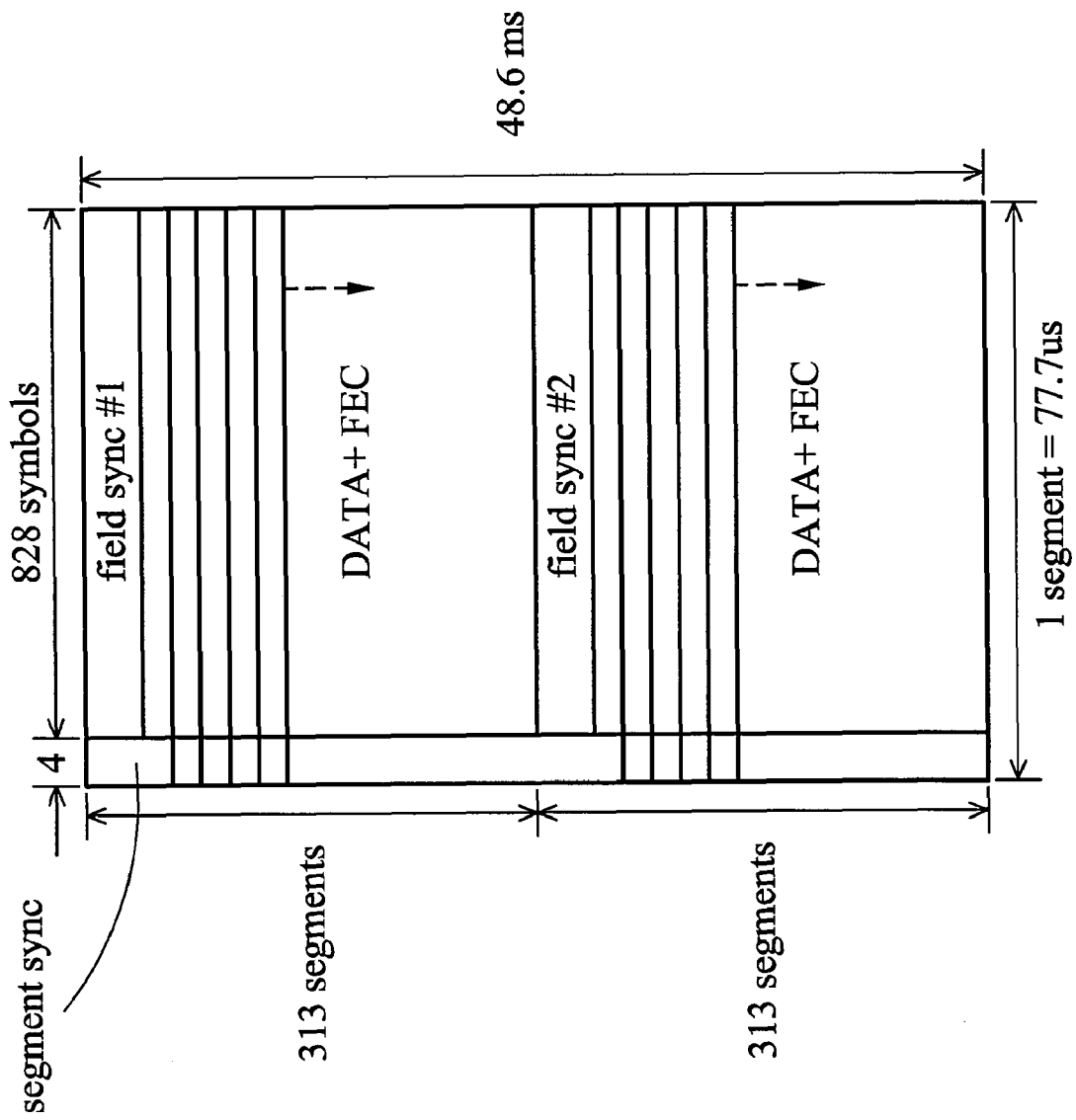
FIG. 7 shows a data frame format for a VSB signal according to the Grand Alliance HDTV system.

One application of the selective slicing equalizer is in the HDTV channel equalization. An HDTV channel equalizer receives a VSB modulated signal. Such a VSB signal is represented by a one-dimensional data symbol constellation wherein only one axis contains quantized data to be recovered. FIG. 7 shows a data frame format for a VSB signal according to the Grand Alliance HDTV system. Each data frame comprises two fields with each field including 313 segments of 832 multilevel symbols. The first segment of each field is referred to as a field segment, and the remaining 312 segments are data segments. Each data segment comprises a four symbol segment sync character followed by 828 data symbols.

Figure 8:
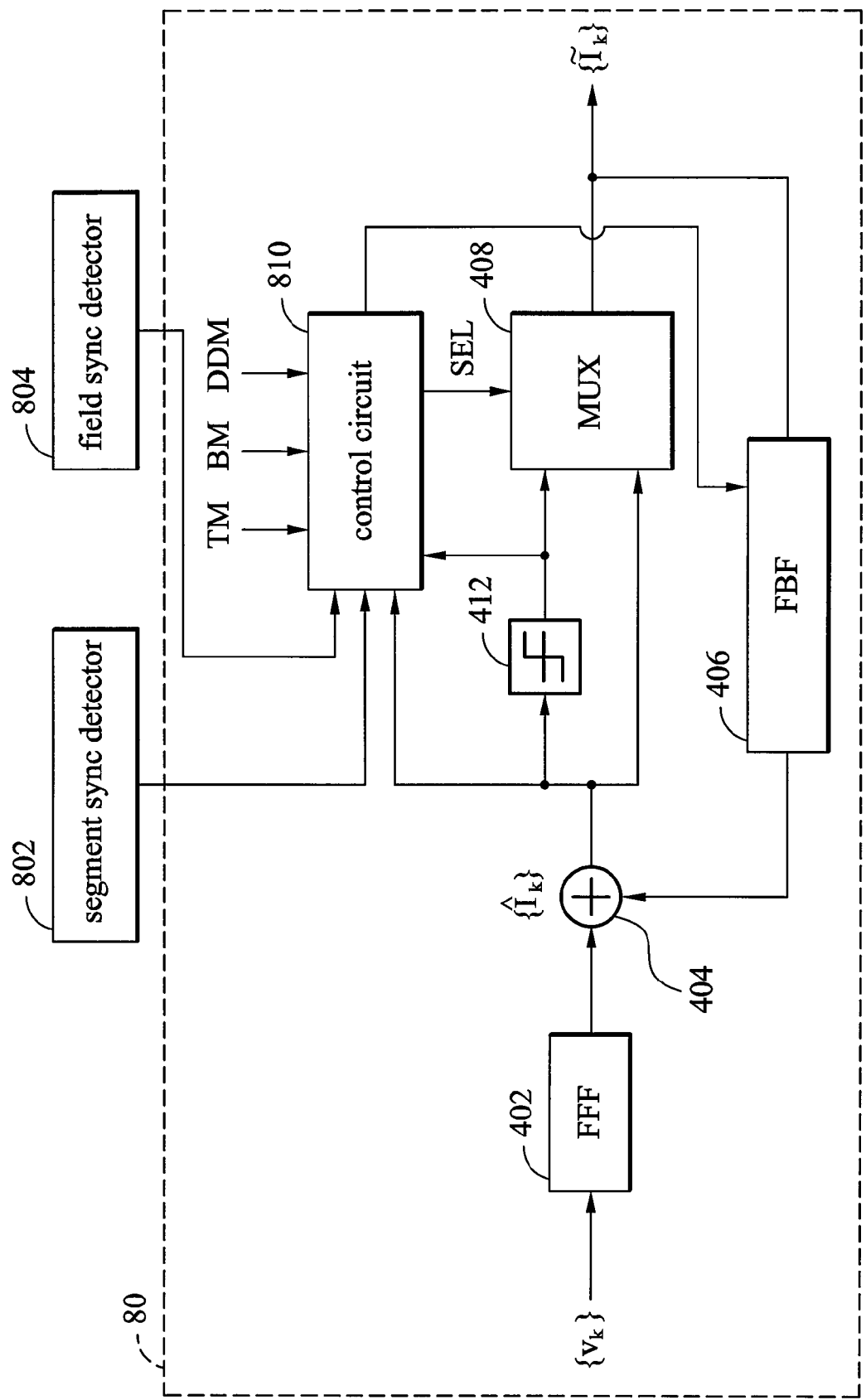
FIG. 8 shows a channel equalizer according to an embodiment of the invention.

FIG. 8 shows a channel equalizer according to an embodiment of the invention. A segment sync detector 802 and a field sync detector 804 are provided to inform a HDTV channel equalizer 80. The control circuit 810 is same as control circuit 410 in FIG. 4, expect the control circuit 810 comprises a storage unit to store the data pattern of field segment and segment sync. When the filed sync detector detects that the current symbol is from a filed segment, the HDTV channel equalizer is operated in a training mode. After the field sync interval, the control circuit 810 is operated in the blind. The decision-directed mode occurs afterwards, when the difference of $\tilde{I}_k$-$\hat{I}_k$ is low enough.

Typical equalizers either use un-sliced $\{\tilde{I}_k\}$ or sliced $\hat{I}_k$ as the input of the feedback filter. Applying un-sliced value $\{\tilde{I}_k\}$ enhances the noise contained in $v_n$, and applying sliced $\hat{I}_k$ would cause equalization error propagation. The disclosed selective slicing equalizer balances the issues of noise enhancement and error propagation, and thus increases the reliability of equalization.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An equalizer, comprising:
   a feed-forward filter receiving an input signal;
   a feedback filter filtering an equalized signal;
   a combiner combining the feed-forward filtered signal and the feedback filtered signal;
   a decision device mapping the combined signal to one symbol of a symbol set;
   a control circuit receiving the combined output and generating a slice control signal;
   a multiplexer selecting the combined signal or the mapped signal as the equalized according to the slice control signal when operated in blind mode,
   wherein the control circuit comprises an error generation module employing several equalization algorithms to obtain different error signals, and the slice control signal is generated according to the error signals.

2. The equalizer as claimed in claim 1, wherein the control circuit further comprises a slice control circuit, the slice control circuit receives the plurality of error signals, determines signs of the plurality of error signals, counts the number of positive signs and negative signs, and generates the slice control signal according to the number of positive and negative signs.

3. The equalizer as claimed in claim 2, wherein the slice control circuit compares the number of positive signs and negative signs, and the multiplexer selects the mapped signal when all signs are the same, otherwise, the multiplexer selects the combined signal.

4. The equalizer as claimed in claim 2, wherein the slice control circuit compares the number of positive signs and negative signs, and the multiplexer selects the mapped signal when half of the signs are the same, otherwise, the multiplexer selects the combined signal.

5. The equalizer as claimed in claim 2, wherein the slice control circuit compares the number of positive signs and negative signs, and the multiplexer selects the mapped signal when more than two signs are the same, otherwise, the multiplexer selects the combined signal.

6. The equalizer as claimed in claim 1, wherein coefficients of the feed-forward filter and feedback filter are updated according to the error signals.

7. The equalizer as claimed in claim 6, wherein the error generation module further comprise a decision directed error circuit and a blind error circuit, when operated in blind mode, a blind error is used to update the feed-forward and feedback filters, when operated in decision directed mode, a decision error is used to update the feed-forward and feedback filter.

8. The equalizer as claimed in claim 1, wherein the equalization algorithms are different.

9. The equalizer as claimed in claim 1, wherein one of the equalization algorithms is the constant-modulus algorithm (CMA).

10. The equalizer as claimed in claim 1, wherein one of the equalization algorithms is the Sato algorithm.

11. The equalizer as claimed in claim 1, wherein one of the equalization algorithms is the least-mean-square algorithm (LMS).

12. An equalizer operated either in a blind mode or a decision directed mode, comprising:
    a feed-forward filter receiving an input signal;
    a feedback filter filtering an equalized signal;
    a combiner combining the feed-forward filtered signal and the feedback filtered signal;
    a decision device mapping the combined signal to one symbol of a symbol set;
    a control circuit receiving the combined output, employing a first mapping function and a second mapping function, wherein the first and second mapping function respectively map a range of values to a first and second result, which are either positive or negative independently, and the control circuit generates a slice control signal according to the first and second results; and
    a multiplexer selecting the combined signal or the mapped signal as the equalized signal according to the slice control signal when operated in the blind mode.

13. The equalizer as claimed in claim 12, wherein the control circuit compares the first and second result to obtain the slice control signal, when the first and second result are in the same sign, the multiplexer selects the mapped signal when all signs are the same, otherwise, the multiplexer selects the combined signal.

14. The equalizer as claimed in claim 12, wherein the control circuit further employs N−2 mapping functions, wherein the results of the N mapping functions are either positive or negative, independently, and the control circuit generates a slice control signal according to the N results.

15. The equalizer as claimed in claim 14, wherein the slice control circuit compares the number of positive results and negative results, and the multiplexer selects the mapped signal when all signs are the same, otherwise, the multiplexer selects the combined signal.

16. The equalizer as claimed in claim 12, the control circuit further comprises a coefficient updating module employing a plurality of equalization algorithms to obtain different coefficient updating results, and coefficients of the feed-forward filter and feedback filter are updated according to coefficient updating results.

17. The equalizer as claimed in claim 16, wherein the coefficient updating module further comprises decision directed update circuit and blind update circuit, when operated in blind mode, a blind updated result is used to update the feed-forward and feedback filters, when operated in the decision directed mode, a decision directed updated result is used to update the feed-forward and feedback filter.

* * * * *